United States Patent [19]

Ryu et al.

[11] Patent Number: 5,794,989
[45] Date of Patent: Aug. 18, 1998

[54] CONSTRUCTION FOR COUPLING TWO TUBES

[75] Inventors: Kyu-Bok Ryu; Bong-Hee Park, both of Yong In, Rep. of Korea

[73] Assignee: Samsung Electronics Co., Ltd., Suwon, Rep. of Korea

[21] Appl. No.: 826,595

[22] Filed: Apr. 3, 1997

[30] Foreign Application Priority Data

Apr. 4, 1996 [KR] Rep. of Korea ............... 1996-10216

[51] Int. Cl.$^6$ ............................................. F16L 17/02
[52] U.S. Cl. ...................... 285/345; 285/348; 285/364; 285/351
[58] Field of Search ............................ 285/364, 365, 285/366, 367, 351, 348, 346, 345, 906, 334.2

[56] References Cited

U.S. PATENT DOCUMENTS

| | | | |
|---|---|---|---|
| 615,767 | 12/1898 | Wade | 285/346 |
| 2,766,999 | 10/1956 | Watts et al. | 285/334.2 |
| 4,170,375 | 10/1979 | Ito | 285/348 |

*Primary Examiner*—Dave W. Arola
*Attorney, Agent, or Firm*—Jones & Volentine, L.L.P.

[57] ABSTRACT

A construction capable of easily coupling or disassembling two tubes. The construction has a first annular flange of an enclosing tube protruding radially outward, a telescoped tube inserted in the enclosing tube, a first seal member inserted between an outer surface of the telescoped tube and an outside cylindrical inner surface of the enclosing tube, a second seal member inserted between the outer surface of the telescoped tube and the outside cylindrical inner surface of the enclosing tube after the first seal member is inserted, and a coupler for coupling the enclosing tube and the second seal member.

1 Claim, 1 Drawing Sheet

1

CONSTRUCTION FOR COUPLING TWO TUBES

BACKGROUND OF THE INVENTION

1. Field of the Invention

The present invention relates to a construction for coupling two tubes, and more particularly, to a construction that is capable of easily coupling or disassembling two tubes.

2. Description of the Related Art

FIG. 1 is a sectional view of a conventional construction for coupling two tubes. Referring to FIG. 1, the conventional construction 10 for coupling two tubes includes an enclosing tube 2, a telescoped tube 3, a seal ring 4, a ferrule 5, and a nut 6. To couple the tubes, a screw means is formed on an outer surface of an end of the enclosing tube 2. The telescoped tube 3 is inserted and fitted in the enclosing tube 2 so as to be in contact with an inside inner surface of the enclosing tube 2. The seal ring 4 is inserted between an outer surface of the telescoped tube 3 and an outside inner surface of the enclosing tube 2, and the ferrule 5 is inserted therein after the seal ring 4 is inserted. The nut 6 accommodates the end of the enclosing tube 2 and engages the screw means of the enclosing tube 2.

In carrying out the coupling operation with the construction 10 as described above, the nut 6, ferrule 5 and the seal ring 4 are initially fitted around the telescoped tube 3, and then an end of the telescoped tube 3 is slid into the enclosing tube 2. Thereafter, the seal ring 4 is inserted between the outer surface of the telescoped tube 3 and the outside inner surface of the enclosing tube 2, and then the ferrule 5 is inserted therein. Thereafter, the nut 6 is slid to the coupling portion and then is screwed on the screw means formed on the outer surface of the enclosing tube 2 so as to be tightly engaged therewith.

However, in the conventional construction 10, the coupling operation can not be performed easily in a narrow space because the nut 6 must travel longitudinally along the telescoped tube 3 at a certain distance in order to be screwed on the screw means of the enclosing tube 2. Further, the ferrule 5 may be worn through repetitive coupling and disassembling, so as to lose its sealing function. Furthermore, when the nut 6 is disassembled, the ferrule 5 trails the nut 6 and may accumulate dirt or particles from the nut 6, which requires replacement of the ferrule 5, thereby delaying further operations.

SUMMARY OF THE INVENTION

The present invention has been made to overcome one or more of the above described problems of the conventional art, and accordingly, it is an object of the present invention to provide a construction that is capable of easily coupling or disassembling two tubes.

To achieve these and other objects, the present invention provides a construction for coupling two tubes, the two tubes including a telescoped tube and an enclosing tube, the construction comprising: a first annular flange protruding radially outward from the enclosing tube, the first annular flange having opposite tapered and flat surfaces; a telescoped tube inserted in the enclosing tube so as to be in contact with an inside cylindrical inner surface of the enclosing tube; a first seal member inserted between an outer surface of the telescoped tube and an outside cylindrical inner surface of the enclosing tube so as to prevent fluid from leaking; a second seal member inserted between the outer surface of the telescoped tube and the outside cylindrical inner surface of the enclosing tube after the first seal member is inserted, so as to ensure the enclosing tube and the telescoped tube are in close contact with each other; and a coupler for coupling the first annular flange of the enclosing tube and the second seal member.

BRIEF DESCRIPTION OF THE DRAWINGS

The above objects, and other features and advantages of the present invention will become more apparent by describing in detail preferred embodiments thereof with reference to the attached drawings, in which.

DETAILED DESCRIPTION OF THE PREFERRED EMBODIMENT

Hereinafter, a preferred embodiment of the present invention will be described in detail with reference to the accompanying drawings.

Figure 1:
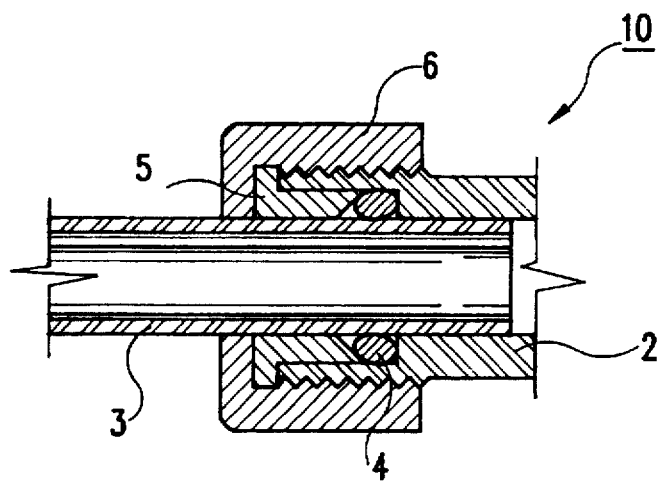
FIG. 1 is a sectional view of a conventional construction for coupling two tubes.
Figure 2:
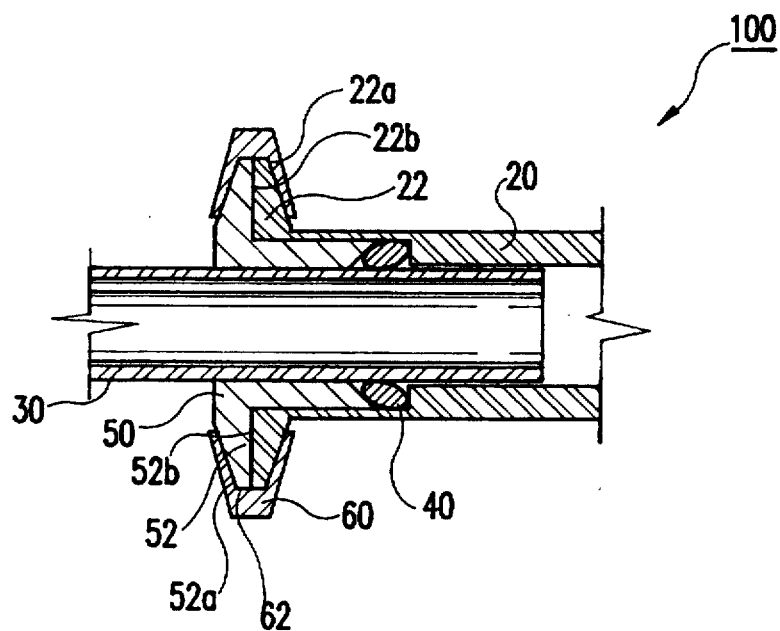
FIG. 2 is a sectional view of a construction for coupling two tubes according to the present invention.

Referring to FIG. 2, in a construction 100 for coupling two tubes according to the present invention, a first annular flange 22 of an enclosing tube 20 protrudes radially outward from an end of the enclosing tube 20 and has opposite surfaces, one of which is tapered 22a and one of which is flat 22b. A telescoped tube 30 is telescoped in the enclosing tube 20 so as to be in contact with an inside cylindrical inner surface of the enclosing tube 20. A first ring-shaped seal member 40 is inserted between an outer surface of the telescoped tube 30 and an outside cylindrical inner surface of the enclosing tube 20 so as to prevent fluid from leaking.

Further, a second seal member 50 is inserted between the outer surface of the telescoped tube 30 and the outside cylindrical inner surface of the enclosing tube 20 after the first seal member 40 is inserted, so as to ensure the enclosing tube 20 and the telescoped tube 30 are in close contact with each other. A second annular flange 52 of the second seal member 50 protrudes radially outward from an end of the second seal member 50 and has opposite surfaces, one of which is tapered 52a and one of which is flat 52b. Note that the tapered surface 52a of the second annular flange is the same as the tapered surface 22a of the first annular flange 22, so as to make the coupling operation easy.

A coupler 60 has a recess 62 for accommodating the first annular flange 22 of the enclosing tube 20 and the second annular flange 52 of the second seal member 50 therein and fastening them to each other, the recess 62 being in close contact with the two tapered surfaces 22a and 52a of the first annular flange 22 and the second annular flange 52. Note that the respective flat surfaces 22b and 52b of the first and second annular flanges 22 and 52 are in contact.

Hereinafter, the operation and the effect of the construction 100 for coupling two tubes according to the present invention as above will be described in detail.

At first, the telescoped tube 30 is inserted into the enclosing tube 20 and guided along the inside cylindrical inner surface. Then the first seal member 40 is inserted between the outer surface of the telescoped tube 30 and the outside cylindrical inner surface of the enclosing tube 20.

Thereafter, the second seal member 50 is inserted between the outer surface of the telescoped tube 30 and the outside cylindrical inner surface of the enclosing tube 20, so as to ensure the enclosing tube 20 and the telescoped tube 30 are in close contact with each other. In this case, the two respective flat surfaces 22b and 52b of the first annular flange 22 and the second annular flange 52 are in close contact with each other.

Thereafter, the coupler 60 is assembled to lock the first annular flange 22 and the second annular flange 52 so that the recess 62 is in close contact with the two tapered surfaces 22a and 52a thereof. Then, the coupling of the two tubes is completed. The enclosing tube 20 and the telescoped tube 30 can easily be disassembled by reversing the order of the coupling operation.

The construction according to the present invention has several advantages. One is that the telescoped tube 30 may be easily coupled and disassembled from the enclosing tube 20 by inserting and drawing out the slim second seal member 50. Also fluid leakage is prevented because the second seal member 50 is not deformed at all.

As described above, the present invention provides distinct advantages in that coupling or disassembling the two tubes is made easy and deformation of the ferrule or the second seal member 50 is prevented by utilizing the slim second seal member 50 and the coupler 60. The coupling operation is simplified and can be carried out efficiently.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. A construction for coupling two tubes, the two tubes including a telescoped tube and an enclosing tube, the construction comprising:

a first annular flange protruding radially outward from the enclosing tube, the first annular flange having opposite tapered and flat surfaces;

the telescoped tube inserted in the enclosing tube so as to be in contact with an inside cylindrical inner surface of the enclosing tube;

a first seal member inserted between an outer surface of the telescoped tube and an outside cylindrical inner surface of the enclosing tube, the first seal member providing a first barrier to prevent fluid from leaking;

a second seal member inserted between and contacting both the outer surface of the telescoped tube and the outside cylindrical inner surface of the enclosing tube, the second seal member being inserted after the first seal member has been inserted and providing a second barrier to prevent fluid from leaking, and having a second annular flange protruding radially outward from an exposed end of the second seal member, the second annular flange having opposite tapered and flat surfaces; and a coupler for coupling the first annular flange of the enclosing tube to the second annular flange of the second seal member by their respective flat surfaces, the coupler having a recess for accommodating the coupled first and second annular flanges, the recess having tapered inner surfaces that are in continuous contact with the respective tapered surfaces of the coupled first and the second annular flanges.

* * * * *